E. AUSEN.
MILK CAN COVER.
APPLICATION FILED FEB. 7, 1921.

1,409,902. Patented Mar. 21, 1922

WITNESSES
George C. Myers
J. T. Schrott

INVENTOR
EMIL AUSEN,
BY
ATTORNEYS

UNITED STATES PATENT OFFICE.

EMIL AUSEN, OF ELEVA, WISCONSIN.

MILK-CAN COVER.

1,409,902.  Specification of Letters Patent.  Patented Mar. 21, 1922.

Application filed February 7, 1921. Serial No. 443,173.

*To all whom it may concern:*

Be it known that I, EMIL AUSEN, a citizen of the United States, and a resident of Eleva, in the county of Trempealeau and State of Wisconsin, have invented certain new and useful Improvements in Milk-Can Covers, of which the following is a specification.

My invention relates to improvements in receptacle closures, it being more particularly an improvement in milk can covers, and it consists in the constructions, combinations and mode of operation herein described and claimed.

One of the foremost objects of the invention is to provide a cover to be used on standard size milk cans for the purpose of enabling cooling and aerating milk and cream.

A further object of the invention is to provide a milk can cover including a top made in such a manner as to prevent foreign substances in the air from falling into the can.

A further object of the invention is to provide a milk can cover wherein the top can be turned in respect to the base, means being provided for locking the aerating openings either in the opened or closed positions.

A further object of the invention is to provide a milk can cover having an umbrella-shaped flange extending below the circumferential air openings to prevent any foreign substance from blowing directly into the can by virtue of shielding said opening.

Other objects and advantages will appear in the following specification, reference being had to the accompanying drawing, in which.

Figure 1:
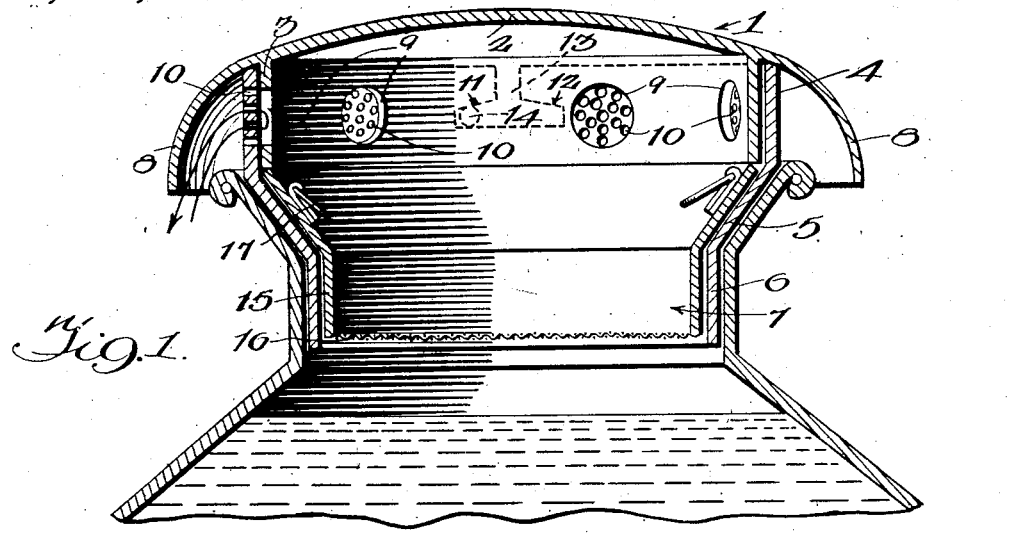
Figure 1 is a vertical section of the upper part of a milk can showing the combination cover in place, the top having been rotated in respect to the base to bring the air openings into alinement.

By way of introduction, it is thought well to briefly describe the purpose that the improved milk can cover is intended to serve in dairying. Ordinarily, in cooling milk, the farmer sets the cans of fresh milk in some cool place, usually taking the covers completely off so as to aerate the milk.

It is common knowledge that the air contains millions of bacteria, and obviously if a can of milk be permitted to stand without a cover on, these bacteria find an entrance into the can. It has been amply demonstrated that bacteria multiply much faster in warm milk than in cold milk, therefore, it is the aim of dairymen not only to cool the milk as quickly as conditions will permit, but also take such primitive steps to keep out bacteria, etc., as their ingenuity can devise.

When a can is standing open, there is always a chance for something to get into it, and many have been the times when butter and cheese makers have found undesirable creatures in the bottoms of cans. It is also common for the dairyman to fit the covers tightly in place on the cans, thus prolonging the cooling period considerably, and by confining the natural odor of the milk, giving it a taste of staleness to a certain degree.

The improved milk can cover 1, seeks to and does overcome all of the foregoing objections and furthermore adds advantages of no little importance, as developed below. This milk can cover, thus generally designated, comprises the top 2 with its rim 3, and the base comprising the upper rim 4, frusto-conical part 5 and lower rim 6.

The last two parts fit into the mouth 7 of the milk can, all of the parts fitting together tightly enough to prevent falling off under any ordinary circumstances and to enable rolling the milk can about as is commonly done during transportation. The top 2 is of a novel shape in that the edge 8 is formed to resemble an umbrella, this edge coming below the openings 9 and 10 in the rims 3 and 4 respectively. Those openings 9 in the rim 3 are sufficiently large to completely embrace all of the minute perforations 10 which are intended to correspond therewith, when the two kinds of openings are moved into registration for the purpose of aerating the contents of the can, as illustrated for example in Figure 1. At diametrically opposite places in the rim 4 are double slots 11 and 12 with a common central entrance 13 for cooperating pins 14 on the rim 3 of the top. The upper edges of these slots are beveled downwardly as clearly shown in Figures 2 and 3. The purpose in thus forming the slots is to cause a binding of the top 2 on the base 5 when the former is turned either to the left or right. In the first instance (illustrated in Figure 2) the openings 9 and 10 are locked in the registering or open position, while in the second instance (illustrated in Figure 3) these openings are locked in the non-registering position. In either case, the top 2 will be found in firm position on the base 5, so that whether the openings are opened or closed, the can may be moved about without danger of the top coming off.

Figures 2, 3:
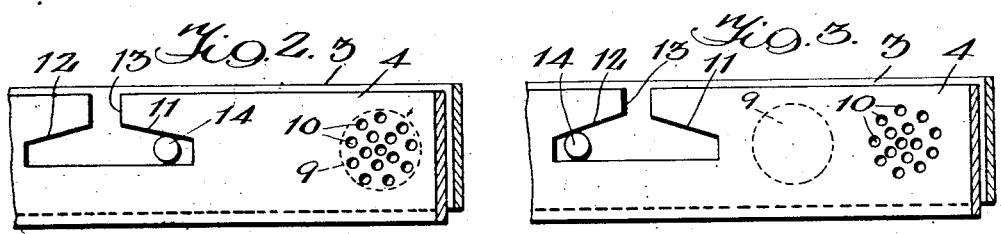
Figure 2 is a development of a part of the rim of the top and base showing how the air openings are locked in the open position.
Figure 3 is a similar view showing these openings locked in the closed position.

Figure 1 shows an all-metal strainer 15 clamped inside the cover by engagement of the rim 3 of the top. This strainer includes the fine screen 16 and rings 17 by which the strainer may be taken out and put in place.

Figures 4, 5, 6:
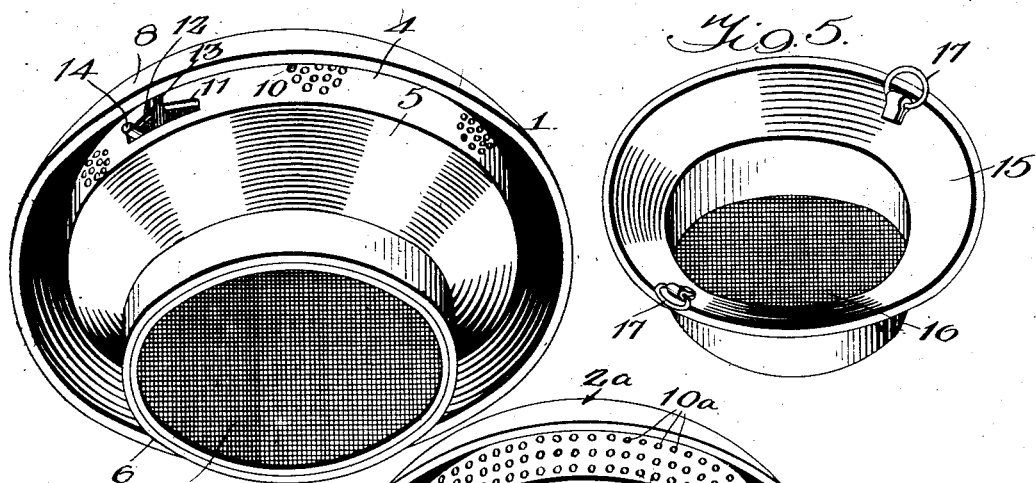
Figure 4 is an inverted perspective view of the combination cover, showing how it appears when raised from the mouth of the can.
Figure 5 is a detail perspective view of the all-metal strainer used in connection with the cover.
Figure 6 is an inverted perspective view of a modification of the cover to be used for ventilating purposes only.

Figure 4 illustrates how the improved cover appears when removed from the can. The screen 16 is shown substantially flush with the edge of the lowermost rim 6.

It is optional with the user whether or not the strainer 15 shall remain in place in the cover. If it is intended to leave the strainer in, the rim of the top will bind it firmly in place so as to prevent rattling. An all-metal strainer is provided because of its numerous advantages over the common cloth strainer. Thick particles of the milk will not adhere so readily to all-metal strainers as they will to a cloth strainer. Furthermore, this type of strainer is more readily cleansed, and is obviously of greater durability than the cloth strainer.

The modification in Figure 6 is much on the same order as the cover in Figure 4. The principal difference is that all of the parts of the modified cover are made in one, that is to say, the ultimate cover consists of one piece. Instead of having circular regions of minute perforations, the rim 4ª has continuous series of apertures 10ª. The rim 4ª, frusto-conical part 5ª and lowermost rim 6ª are all one piece, as is, of course, the top 2ª and umbrella flange 8ª also.

The cover in Figure 6 is made for ventilating purposes only, and is not primarily intended to be used on the can under all circumstances, i. e. for ventilating purposes and also as a can closure during transportation. Mention was made above of some of the advantages to be derived by the use of either of the two covers.

Considerable importance is attached to the umbrella shape of the flange 8. As stated before, this extends down far enough below the openings 9 and 10 to shield them from any substance making directly in their direction. The reader will see at once that an object directed toward the flange 8 will either strike that flange and bound off toward the top, or escaping the flange, will strike the frusto-conical part of the can itself and so bound off toward the bottom.

Water splashing on the upper part of the milk can and perhaps reaching the space inside the umbrella flange, will be quite effectively turned aside from directly entering the openings by flowing back down on the inside of the flange and dripping onto the can. The advantages of the double locking arrangement for the top 2, i. e. the slots 11 and 12 and the pins 14, speak for themselves without added description.

While the construction and arrangement of the improved milk can cover as herein described and claimed, is that of a generally preferred form, obviously modifications and changes may be made without departing from the spirit of the invention or the scope of the claims.

I claim:—

1. A milk can cover, with means to fit into the mouth of the can having a perforated part extending thereabove; and a top fitting into said means and having a flange extending over and below the line of perforations and into proximity with the edge of the can mouth.

2. A milk can cover, comprising concentric rims with an intermediate frusto-conical part, the rim of largest diameter having perforations; and a top fitting the largest rim, with a flange curving thereover and terminating at a point below the perforations.

3. The combination in a milk can cover, of a base to be tightly fitted into the mouth of a can, with perforations disposed above the edge; and a top with a rim to fit the base, with perforations movable into or out of registration with the corresponding perforations, and including a covering flange terminating at a point below any of the perforations to prevent particles from directly reaching the perforations.

4. A milk can cover, comprising a base to tightly fit in the mouth of a can, with a rim extending thereabove with perforations and double slots having parts inclined oppositely; and a top with a rim to tightly fit the base, with perforations coacting with those of the base rim, also having a pin movable over the inclines of either slot and accordingly wedge the top down and lock the perforations in or out of registration, the top including a flange extending downwardly to shield the perforations.

5. A milk can cover, comprising a base to be tightly fitted in the mouth of a can, a top to tightly fit the base, and a strainer made to fit the base and adapt it to be clamped in place when the top is applied, to prevent rattling.

6. A milk can cover, comprising concentric rims with an intermediate frusto-conical part, the upper rim having a plurality of minute perforations in circular series, and a double slot with a pin entrance, each slot with opposite parts downwardly beveled from the entrance; and a cover including a circumferential flange curving down below the lowermost perforations, including a rim fitting the upper base rim, with large openings to register with said circular series, and a pin movable into either slot to lock the openings and perforations in or out of registration.

7. A one-piece milk can cover, comprising concentric rims with an intermediate frusto-conical part, the upper rim with a continuous belt of minute perforations, and a top secured to the uppermost rim, with a flange curving down thereover to a point below the belt of perforations.

8. A milk can cover comprising a base with perforations and a double bayonet slot, and a top with a rim to fit the base, having an opening and a pin in said slot, securing the top when at either extremity and thereby locking the perforations and opening either in or out of registration.

EMIL AUSEN.